United States Patent Office 3,544,251
Patented Dec. 1, 1970

3,544,251
APPARATUS FOR SEQUENTIALLY SELECTING
PHOTOFLASH LAMPS FOR IGNITION
Edison R. Brandt, Cohasset, Mass., assignor to Polaroid Corporation, Cambridge, Mass., a corporation of Delaware
Filed Oct. 1, 1968, Ser. No. 764,062
Int. Cl. F21k 5/02
U.S. Cl. 431—95   7 Claims

ABSTRACT OF THE DISCLOSURE

A photoflash lamp assembly supports a plurality of photoflash lamps for sequential ignition and includes means responsive to discharge of one of the lamps for selecting another lamp for subsequent ignition.

SUMMARY OF THE INVENTION

This invention involves a multilamp photoflash assembly usable with a photographic camera and an electrical circuit for discharging photoflash lamps connected therein in timed relationship with exposure producing operation of the camera. The photoflash lamp assembly is connectable in the circuit and includes means responsive to radiation resulting from discharge of one lamp for selecting another lamp for subsequent ignition, one lamp being ignited in timed relationship with each exposure producing operation of the camera when the photoflash lamp assembly is connected in the photoflash lamp ignition circuit.

The advent of small, all-glass photoflash lamps has resulted in the development of various photoflash lamp assemblies containing a plurality of flash lamps for ignition in synchronization with exposure producing operation of a camera. The structure of this invention enables a plurality of such lamps to be simultaneously directed toward a scene to be photographed for sequential discharge.

It is a primary object of this invention to provide a multilamp photoflash assembly including means responsive to discharge of one lamp for connecting another lamp in a photoflash lamp ignition circuit.

It is also an object of this invention to provide a photoflash lamp assembly including a plurality of photoflash lamps wherein thermal radiation resulting from the discharge of one lamp operates a switch to connect another lamp in a photoflash lamp ignition circuit.

DETAILED DESCRIPTION OF THE DRAWINGS

Photoflash lamp assembly 10 supports a plurality of small, all-glass photoflash lamps 11 for simultaneous direction toward a scene to be photographed and includes apparatus for selecting the lamps for ignition one at a time in sequence, each lamp being selected for ignition in response to the previous discharge of a predetermined photoflash lamp.

Figure 1:
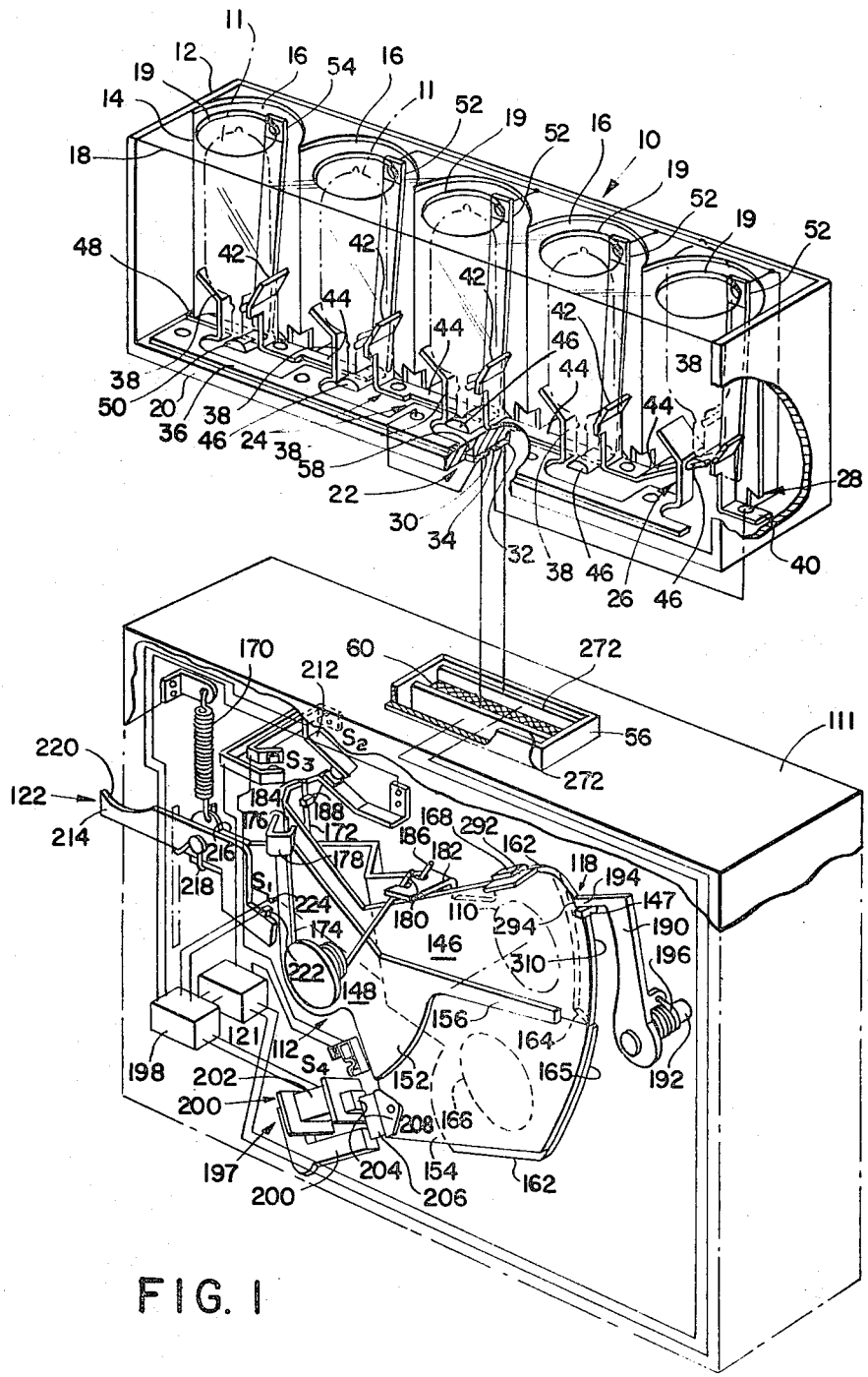
FIG. 1 is a perspective view showing a preferred embodiment of this invention for use with an exposure control system.

Referring to FIG. 1, assembly 10 includes housing 12, reflecting means 14 defining a number of individual reflectors 16 in a linear array, transparent cover 18 defining openings 19 and molded plastic base 20. Base 20 includes terminal means 22 for mounting assembly 10 upon a camera and electrically connecting the assembly to a photoflash lamp ignition circuit and also supports means 24 for connecting the individual lamps of the assembly in the photoflash lamp ignition circuit one at a time in sequence.

Terminal means 22 includes electrically conductive terminals 30 and 32 separated by gap 34. Terminals 30 and 32 are arranged for cooperation with terminals 272 of the photographic camera.

Means 24 includes terminal means 26 defining an individual socket for each lamp of the linear array and switch means 28 for controlling the sequential connection of the photoflash lamps in the circuit.

Terminal means 26 defines a pair of electrical contacts for each lamp. A common terminal element defines one contact for each lamp and includes electrical conductor 36 and a number of terminal elements 38, one for each lamp of the linear array. Terminal means 26 also includes an initial terminal element 40 for the lamp to be first discharged and a plurality of terminal elements 42, one for each of the remaining lamps. Each terminal element 42 has a resilient extension or contact 44 extending therefrom to form a part of switch means 28.

Switch means 28 includes the aforesaid extensions or contacts 44 and insulating members 46 carried by an end of extensions or contacts 44 positions between an adjacent pair of terminal elements which for the first lamp to be discharged are shown at 38 and 40. Each contact 44 extends from a terminal element 42 and passes rearwardly of an adjacent terminal element 38 without contact therewith, to the aforesaid position between a pair of terminal elements 38 and 42 to position insulator 46. Switch means 28 also includes a bimetallic switching contact 52 associated with each lamp in the array except the last to be ignited. Bimetallic switching contacts 52 are attached at the upper portion to the individual reflector 16 for each of the lamps except the last to be ignited and extend downwardly and away from the reflector so that a lower end thereof is positioned for cooperation with contacts 44 and insulators 46 in a manner hereafter to be described. Bimetallic switching contacts 52 and initial terminal element 40 extend from conductor 53 and are connected with terminal 32 by the conductor.

A construction similar to the elements of switch means 28 described above is associated with the lamp which is last to be ignited; the distinction being that the elements have no switching significance since there is no other lamp to be connected in the photoflash lamp ignition circuit for discharge. Ejecting spring 48 extends to a position between terminal elements 38 and 42 of the last lamp to be discharged for supporting insulator 50. A bimetallic ejecting element or contact 54 extends from an upper portion of the reflector associated with the last lamp to be discharged to a position for cooperation with ejecting spring or contact 48 and insulator 50. Ejecting spring 48 and bimetallic ejecting element 54 operate to eject the last lamp to be discharged subsequent to discharge thereof, in a manner hereafter described.

Lamp retaining sockets formed by terminal elements 38, 40 and 42 comprise sufficient inherent resilience to enable them to firmly frictionally engage the base of lamps 11 to provide an electrical connection between the lamps and the aforesaid contacts and to frictionally retain the lamps in the sockets.

Photographic exposure control apparatus usable with the flash lamp selecting apparatus of this invention includes means 110 supported by housing 111 and defining an exposure aperture, shutter 112, control means 114, drive means 116, latch means 118, retaining means 120, photoflash lamp ignition circuit 121, photoflash lamp assembly mounting means 119 and operating means 122.

Shutter 112 includes opening blade means 146 and closing blade means 148, each pivotally mounted upon hub 150 for aperture blocking and unblocking movement. The closing blade means includes support portion 152 and blade portion 154. The support portion is pivotally mounted upon hub 150 in overlying relationship to opening blade means 146. Blade portion 154 is mounted upon support portion 152 so that it lies in coplanar relationship with blade 146. In the position of FIG. 1, an edge of blade portion 154 abuts an edge of blade 146. Elongated portion 156 of support 152 forms a light seal along the abutting edges.

Control means 114 comprises a capping blade 162 pivotally mounted upon hub 150 for movement between first and second positions. The capping blade forms cam 164 and aperture 166 and supports abutment 168. The abutment extends into the path of movement of the opening blade means and, due to the abutting relationship of the opening and closing blades, limits counterclockwise movement of both the opening and closing blades. Spring 170 continuously biases the capping blade in a clockwise direction toward its first position. When the capping blade is moved toward its first position, abutment 168 engages opening blade 146 and urges the opening blade and closing blade 148 clockwise toward their respective aperture blocking and unblocking positions. Retaining means 120 is positioned adjacent the aperture unblocking position of closing blade 148 for limiting clockwise motion. Since spring 170 continuously biases the control means in the clockwise direction, blade 148 is continuously and firmly pressed against the retaining means, for reasons which will hereafter be described.

Drive means 116 includes drive springs 172 and 174 for blade 146 and blade 148, respectively. Spring 174 is coiled about hub 150 and includes end portion 176 which extends outwardly from hub 150 and engages closing blade 148 at 178 and end portion 180 which extends outwardly from the hub and engages control means 114 at 182. Similarly, spring 172 is coiled about the hub and includes end portions 184 and 186 which extend outwardly from the hub and engage opening blade 146 at 188 and control means 114 at 182, respectively. Drive spring 172 is preloaded to bias the opening blade for counterclockwise rotation about the hub while biasing the capping blade for clockwise rotation, thus biasing the opening blade against the abutment 168 of the capping blade. Similarly, spring 174 is preloaded to bias the closing blade for counterclockwise rotation about the hub while biasing the capping blade for clockwise rotation so that the closing blade is biased against the opening blade. All three of the above described blades may be moved together, as a unit, without influencing the condition of drive springs 172 and 174; the condition of the drive springs being affected only when there is relative motion between the blades. The preloaded condition of the springs serves to maintain the elements in their proper relative positions when the apparatus is in the rest position.

Latch means 118 releasably holds opening blade 146 in its aperture blocking position against the bias of spring 172. It includes arm 190 pivotally mounted upon pin 192, projection 194 extending from the end of arm 190 for releasably engaging an offset portion 147 of opening blade 146 and spring 196 for exerting a counterclockwise bias upon arm 190.

Retaining means 120 may comprise, for example, electrical control circuit means 198, electromechanical holding device 197 and switches $S_1$ and $S_2$.

One example of a control circuit suitable for use with retaining means 120 is disclosed in U.S. Pat. No. 3,326,103 which was issued to J. M. Topaz on June 20, 1967. The circuit includes a photoresponsive element, such as a cadmium sulfide photoconductor, arranged to receive light from the scene being photographed and having a resistance which is functionally related to the intensity of scene light. The timing operation of the circuit is responsive to the resistance value of the photoresponsive element.

The electromechanical holding device may involve an electromagnet including U-shaped core 200 and electrically energizable coil 202 wound around one leg of the core, coil 202 being included in circuit 198. The free ends, 204, of the core are coplanar and cooperable with magnetizable keeper 206 mounted upon closing blade means 148. The core of the electromagnet is positioned adjacent the aperture unblocking position of the closing blade means for contact with the keeper when the closing blade is in the aforesaid aperture unblocking position, the core and keeper being so arranged that surface 208 of the keeper contacts surfaces 204 of the U-shaped core to define a magnetc circuit. When the electromagnet is energized, a sufficient magnetomotive force is applied to the magnetic circuit to hold the keeper against the core and thus retain the closing blade in aperture unblocking position.

Switch $S_1$ is normally open and is closed to energize the timing circuit means by initial operation of operator means 122. Switch $S_2$ may includes poles 210 and 212 wherein pole 210 is normally biased out of contact with pole 212 and adapted to be thrown into contact therewith when opening blade means 146 is in its initial position. Switch $S_2$ is operative in conjunction with timing circuit means 198 and coil 202 included therein, for controlling exposure interval duration.

Photoflash lamp ignition circuit 121 is provided and may be associated with control circuit 198. Circuit 121 incorporates, in a series, a pair of terminals 272; a flash ignition switch $S_3$ which when closed completes circuit 121 for igniting a flash lamp; and switch $S_4$ for opening circuit 121 while switch $S_3$ is closed. Switch $S_3$ is biased open and positioned to be closed by aperture unblocking movement of opening blade means 146. Switch $S_4$ is biased open and held closed by closing blade means 148 when the closing blade means is in its aperture unblocking position. When the closing blade means begins to move toward its aperture blocking position, switch $S_4$ opens according to its bias to open circuit 121.

Means 119 for mounting assembly 10 and electrically connecting it to flash lamp ignition circuit 121 may be of the type described in U.S. patent application Ser. No. 762,308 entitled, "Photographic Camera" and filed Sept. 16, 1968 in the name of Edison R. Brandt. Means 119 includes assembly aligning flange 56 which cooperates with groove 58 in base 20 of assembly 10 for aligning the assembly relative to housing 111 to thereby direct all lamps in the assembly toward the scene to be photographed when the assembly is mounted on the housing. Terminals 272 are configured as elongated bars and are spaced apart by electrically nonconductive magnet 60. In this manner, terminals 272 forming the poles of a permanent magnet, are electrically insulated from each other and are magnetically connectable with terminals 30 and 32 of assembly 10. When groove 58 of assembly 10 is aligned with flange 56 and terminals 30 and 32 are brought into contact with the pair of terminals 272, terminals 272 magnetically engage terminals 30 and 32 for securely holding the assembly upon housing 111 and for producing electrical connection between circuit 121 and assembly 10.

Operator 122 includes actuator lever 214 pivotally mounted to extension 216 of capping blade 162 and biased for counterclockwise movement about the pivotal mount by spring means 218. End 220 of lever 214 extends through a slot in a side of housing 111 for manual engagement. Terminals 222 and 224 of switch $S_1$ are mounted, respectively, upon actuator 214 and extension 216 for contact in response to initial movement of the actuator. Spring means 218 is substantially weaker than spring 70. Thereby, manual pressure applied to end 220 of lever 214 will first close switch $S_1$ and then impart movement to capping blade 162.

Operation of the above described preferred embodiment of this invention will now be described.

Figure 3:
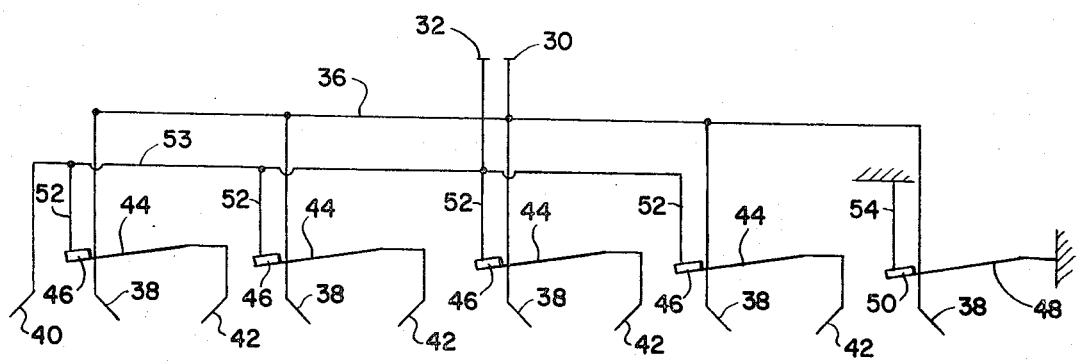
FIG. 3 is a schematic illustration of the preferred embodiment of FIG. 1.
Figure 2:
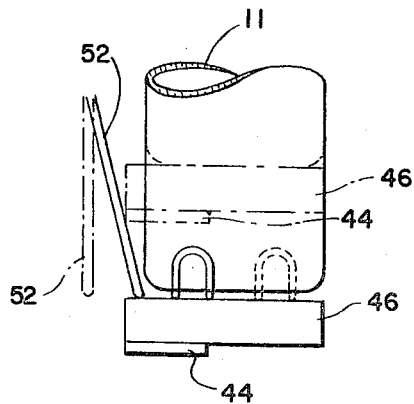
FIG. 2 is a detailed view of a portion of the apparatus illustrated in FIG. 1.

To initiate operation, assembly 10 having flash lamps operatively installed therein is mounted upon the photographic camera as described above. Referring to FIG. 2, it can be observed that when the lamps are operationally mounted in the assembly, the lower end of bimetallic switching contacts 52 rest upon upper surfaces of insulators 46 to hold the insulators and contact 44 down adjacent base 20 of assembly 10, against the upward bias of contacts 44. Bimetallic ejecting element 54 likewise rests on an upper surface of insulator 50 to hold insulator 50 adjacent base 20 against the upward bias of spring 48. Lamps 11 are retained in the sockets by the appropriate terminal elements 38, 40 and 42. When contacts 52 hold down contacts 44 and insulators 46, only the first lamp to be ignited is electrically connected in circuit 121. All of the terminal elements 38 are electrically connected the circuit by conductor 36, terminal 30 and one of the terminals 272; terminal element 40 is connected in the circuit by means of terminals 32 and the other contact 272. Insulating members 46 positioned between contacts 44 and bimetallic switching contacts 52 prevent electrical connection between the extensions and contacts 52 and thereby prevent all the other lamps from being connected in circuit 121. This can best be illustrated by reference to the schematic, FIG. 3, wherein it is shown that interposition of the insulator between contacts 44 and bimetallic switching contacts 52 insures an open circuit at each pair of lamp supporting contacts except the one pair which includes terminal element 40.

To produce a photographic exposure, lever 214 is displaced downwardly to initiate exposure-producing operation of the apparatus. Downward movement of the lever first closes switch $S_1$. Closure of switch $S_1$ energizes timing circuit 198 and coil 202 of an electromechanical holding device 197 to prevent forward movement of closing blade means 148 according to the bias of its drive spring, which movement would otherwise occur upon the subsequent movement of blade 146. Energization of the coil provides, in the magnetic circuit of core 200 and keeper 206, a magnetic induction sufficiently large to create a force on the keeper for holding the closing blade in its initial position against the bias of its drive spring independently of movement of opening blade 146.

Further downward movement of the lever effects counterclockwise movement of control means 114 from its first position toward its second position, against the bias of spring 170. Movement of the control means removes abutment means 168 from engagement with surface 292 of the opening blade. The opening blade moves slightly within its aperture blocking position to close gap 294, existing due to the previous retention of blade 146 by abutment means 168, and is releasably held in aperture blocking position by latch means 118.

Counterclockwise movement of control means 114, while movement of the opening and closing blades are arrested, "winds" drive springs 172 and 174 to store a predetermined amount of energy therein in addition to the energy stored therein due to the preloaded condition. Control means 114 ultimately reaches a position wherein cam surface 164 engages projection 194 of latch means 118. A further increment of movement carries the control means to its second position wherein it lies in unblocking relationship with the exposure aperture. The aforesaid further increment of movement causes cam surface 164 to move projection 194 clockwise, off spening blade 146, to release the opening blade for movement. Projection 194 continues to ride upon raised surface 165 of cam 164 and thereby prevents return movement of the latch under the influence of biasing spring 196.

The opening blade moves toward and to its aperture unblocking position, under the influence of drive spring 172, to initiate an exposure interval. During its movement, the opening blade opens switch $S_2$ to activate circuit means 198 to initiate the timing operation and then closes switch $S_3$ to complete the photoflash lamp ignition circuit, switch $S_4$ being held closed by blade 148. The single lamp connected in circuit 121 by terminal element 38 and terminal element 40 is ignited when switch $S_3$ is closed, ignition taking place in a predetermined timed relationship to the aforesaid aperture unblocking movement of the opening blade. Destruction of the lamp filament resulting from ignition of the lamp breaks the electrical connection between terminal element 40 and its associated terminal element 38, thus opening circuit 121.

The timing operation initiated by opening of switch $S_2$ is completed a predetermined interval after initiation thereof in accordance with the operation of timing circuit 198. The completion of the timing operation de-energizes coil 202. Spring 174 acting on closing blade 148 then advances the closing blade toward and to its aperture blocking position to end the exposure interval. Initial movement of the closing blade permits $S_4$ to open according to its bias to thus open circuit 121. In its aperture blocking position, the closing blade abuts the opening blade and is biased into continuous contact therewith by spring 174.

Lamp selecting operation of assembly 10 takes place in response to thermal radiation resulting from the discharge of a photoflash lamp. In the operation described above, thermal radiation from the discharged lamp heats the bimetallic switching contact 52 attached to the reflector 16 behind the discharged lamp and causes it to deflect away from the lamp so that it moves off insulator 46, thus allowing the extension or contact 44 to move up, according to its resilient bias. See FIG. 2. Upward movement of contact 44 raises an insulator 46 and thus raises the discharged lamp. When the discharged lamp is raised, it protrudes through opening 19 above it to indicate that it has been discharged. Referring to FIG. 2, it can be seen that the bimetallic switching contact will move to a dotted line position in response to thermal radiation for releasing contact 44 and insulator 46. Thereafter it cools and returns to a position substantially identical to that which it originally occupied. Upon return, it electrically connects with the end of the contact 44 which it previously released, this contact 44 having moved to the dotted line position. This switching operation electrically connects a selected fresh lamp for subsequent discharge. The circuit to the selected lamp is completed through the bimetallic switching contact 52 located behind the last discharged lamp, contact 44 cooperable with the aforesaid bimetallic contact, and terminal elements 42 and 38 of an unused lamp adjacent the previously discharged lamp. In this manner, all the lamps are dischargeable one at a time in succession in response to successive exposure producing operations of the camera. When the final lamp has been discharged, bimetallic ejecting element 54 deflects and moves off insulator 50 to permit spring 48 to raise insulator 50 and to project the final lamp through the opening 19 associated therewith to indicate that the final lamp has been discharged and that a flash lamp supply is needed.

In operation, the duration of the exposure interval is of a shorter period of time than that required for bimetallic switching contacts 52 to release contacts 44 for movement and then establish electrical contact with the extensions. In this manner, a fresh lamp is not selected for ignition while circuit 121 remains closed after discharge of the previous lamp. For example, in the apparatus described above, the circuit is completed when opening blade 146 moves to its aperture unblocking position, while closing blade 148 is retained in its aperture unblocking position. The circuit is not opened until the closing blade is released and moves toward its aperture blocking position. Therefore, the apparatus must prevent connection of a fresh lamp in circuit 121 prior to initial movement of closing blade 148 from its aperture unblocking position. To effect this, circuit 198 limits the duration of exposure intervals during photography utilizing photoflash illumination to a predetermined length; for example, 34 milliseconds. Accordingly, bimetallic contacts 52 are calibrated to require a longer time; for example, 55 milliseconds, to establish electrical contact with extensions 44 in response to thermal radiation resulting from discharge of a photoflash lamp. Thereby circuit 121 is opened subsequent to each exposure, prior to connection of a fresh flash lamp therein.

When all the lamps in assembly 10 have been discharged, the assembly may be lifted from the camera. The protruding lamps are manually removed. Fresh flash lamps are operatively installed in the assembly by dropping the lamps, base first, through openings 19. Each lamp is properly oriented due to the shape of terminal elements 38, 40 and 42 and rests on insulators 46 or 50. The lamps then are manually passed downwardly. As contacts 44 and spring 48 are being deflected downwardly they cam contacts 52 and 54 back until insulators 46 and 50 pass beneath the lower end of the faoresaid members 52 and 54. When this occurs, the resilient spring bias of contacts 52 and 54 causes them to move to a position over the upper surface of insulators 46 and 50 and thereby releasably latch extensions 44 and spring 48 in a manner restraining upward movement of the insulators. The apparatus is thus reloaded and reset to its original condition wherein a plurality of lamps are arranged for sequential ignition.

Since human reaction time involved in operating the apparatus described above substantially exceeds the longest average exposure apt to be used under normal "snapshot" conditions of scene brightness, the contacts of switch $S_1$ will be closed for at least as long as the correct exposure time.

It should be understood that the terms "up," "down" and the like are used in the foregoing disclosure to describe movement of various elements as seen in the figures and are not intended to be used in a limiting sense.

Since certain changes may be made in the above apparatus without departing from the scope of the invention herein involved, it is intended that all matter contained in the above description or shown in the accompanying drawings shall be interpreted as illustrative and not in a limiting sense.

I claim:
1. A multilamp photoflash assembly connectable to a photoflash lamp ignition circuit comprising:
  (a) means supporting a plurality of photoflash lamps for simultaneous direction toward a scene to be photographed;
  (b) a plurality of switches, each switch being responsive to radiation resulting from discharge of a predetermined one of said lamps
  first contact means spring biased for movement from one position to another;
  means forming electrical insulation along one portion of said first contact means; and
  bimetallic contact means locatable to engage said insulation for holding said first contact means in its one position and movable in response to thermal radiation resulting from discharge of one lamp for permitting said first contact to move to its other position, thereafter said bimetallic contact being reversibly movable to a position for electrical connection with said first contact means for electrically connecting another lamp in said circuit.

2. An assembly according to claim 1 wherein said switches are responsive to thermal radiation.

3. An assembly according to claim 1 wherein said first contact means is configured and arranged for movement from its one position to its other position for displacing said one lamp to indicate discharge thereof.

4. A multilamp flash assembly connectable to a photoflash lamp ignition circuit comprising:
  means supporting a plurality of photoflash lamps in an array having a predetermined firing order from first to last and in an orientation of simultaneous direction toward a scene;
  terminal means for electrically connecting each said photoflash lamp with said circuit; and
  switch means coupled between each of select ones of said terminal means and said circuit, comprising a pair of electrically conductive contacts, said contacts being biased for mutual electrically insulated engagement and movable out of said electrically insulated engagement in response to the ignition of a photoflash lamp connected with a next preceding terminal means in said predetermined firing order, and subsequently, movable into electrically conductive mutual engagement so as to enable said select terminal means to pass electrical current through a photoflash lamp connected therewith.

5. An assembly according to claim 4 wherein one of said contacts of said switch means is located in the path of thermal radiation resulting from said ignition of the next preceding photoflash lamp and is movable in response to said thermal radiation away from said mutual electrically insulated engagement.

6. A multilamp flash assembly connectable to a lamp ignition circuit comprising:
  means for supporting a plurality of photoflash lamps for simultaneous direction toward a scene to be photographed, said photoflash lamps being arrayed in a predetermined firing order from first to last; and
  switch means comprising a pair of electrically conductive contacts, each said pair of contacts connecting a predetermined one of said photoflash lamps in circuit when closed and disconnecting said lamp from said circuit when open, one of said contacts being spring biased into electrically insulated engagement with the other, the other of said contacts being formed as a bimetallic element movable in response to thermal radiation from a next preceding photoflash lamp out of said electrically insulative engagement, and subsequently, reversibly movable into electrically conductive engagement with said spring biased contact.

7. The multiflash assembly of claim 6 wherein said spring biased contact is configured for retention in a loaded position when insulatively engaged by said bimetallic contact and is movable from said position when said pair of contacts are disengaged to cause the displacement of said next preceding photoflash lamp with which it is associated with.

References Cited

UNITED STATES PATENTS 3,443,875  5/1969  Herrmann _____ 431—95

FOREIGN PATENTS 1,103,682  2/1968  Great Britain _____ 431—95
1,192,047  4/1965  Germany _____ 431—95
6702313    7/1967  Netherlands _____ 240—1.3

EDWARD J. MICHAEL, Primary Examiner

U.S. Cl. X.R.

95—11.5; 240—1.3